INVENTOR.
William W. Taylor.
BY
Wood, Herron & Evans,
ATTORNEYS.

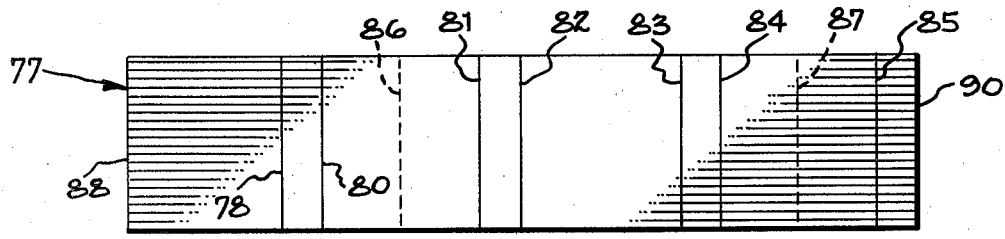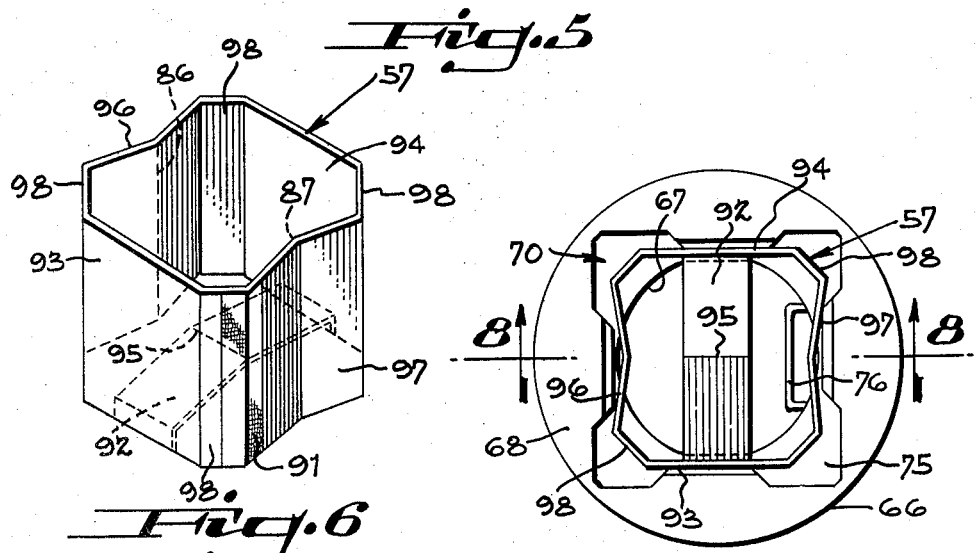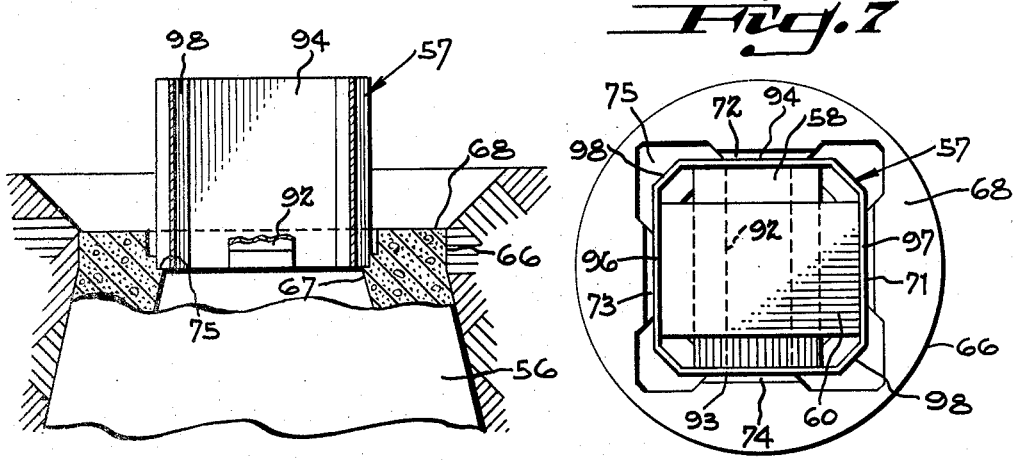

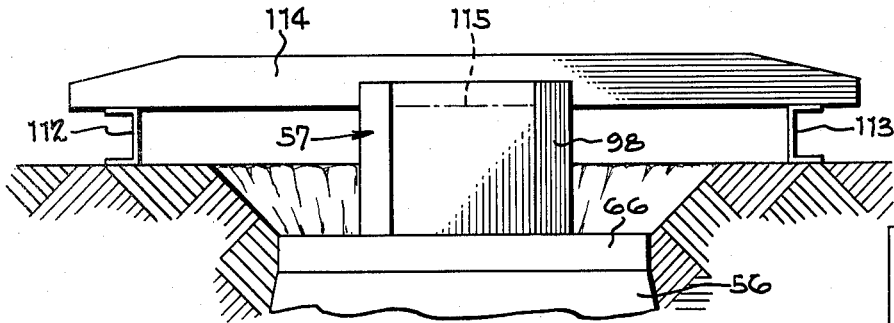
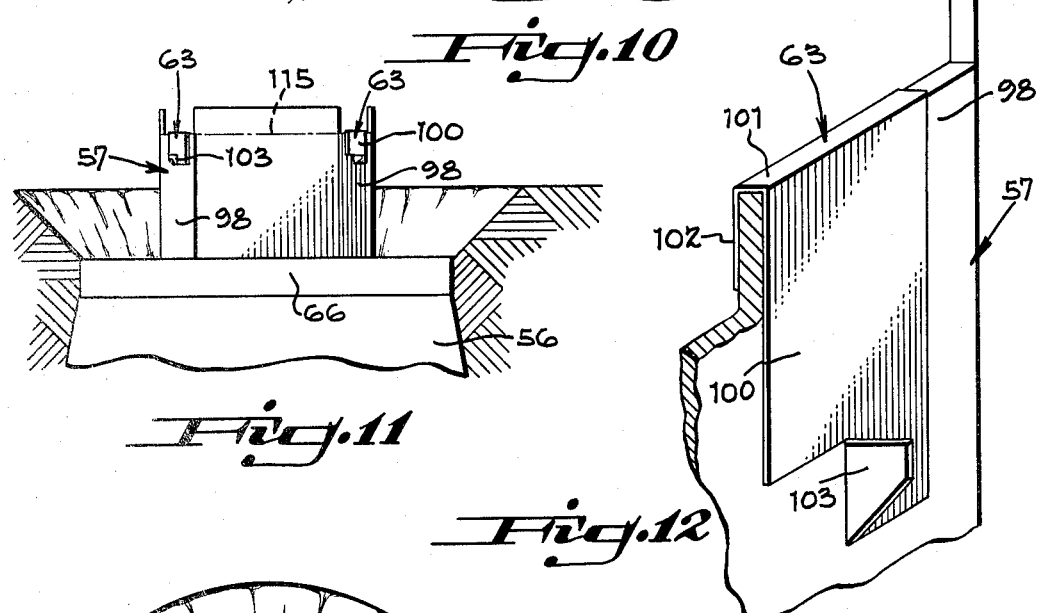
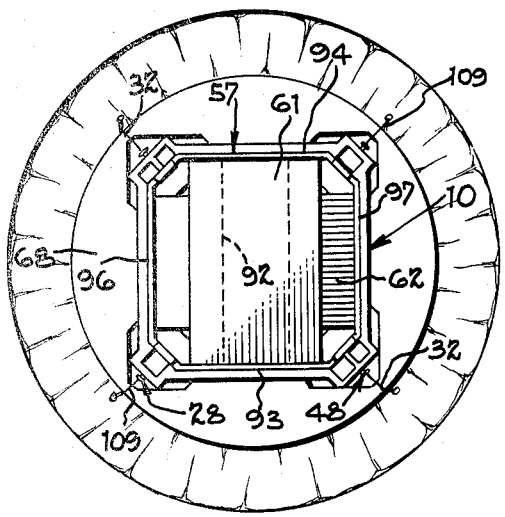
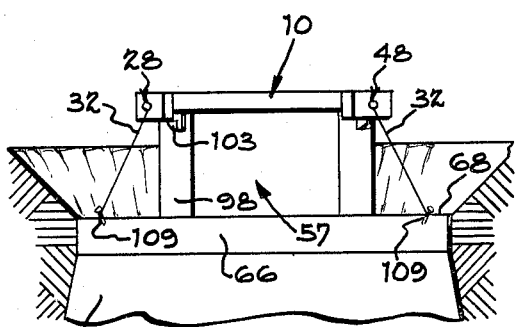

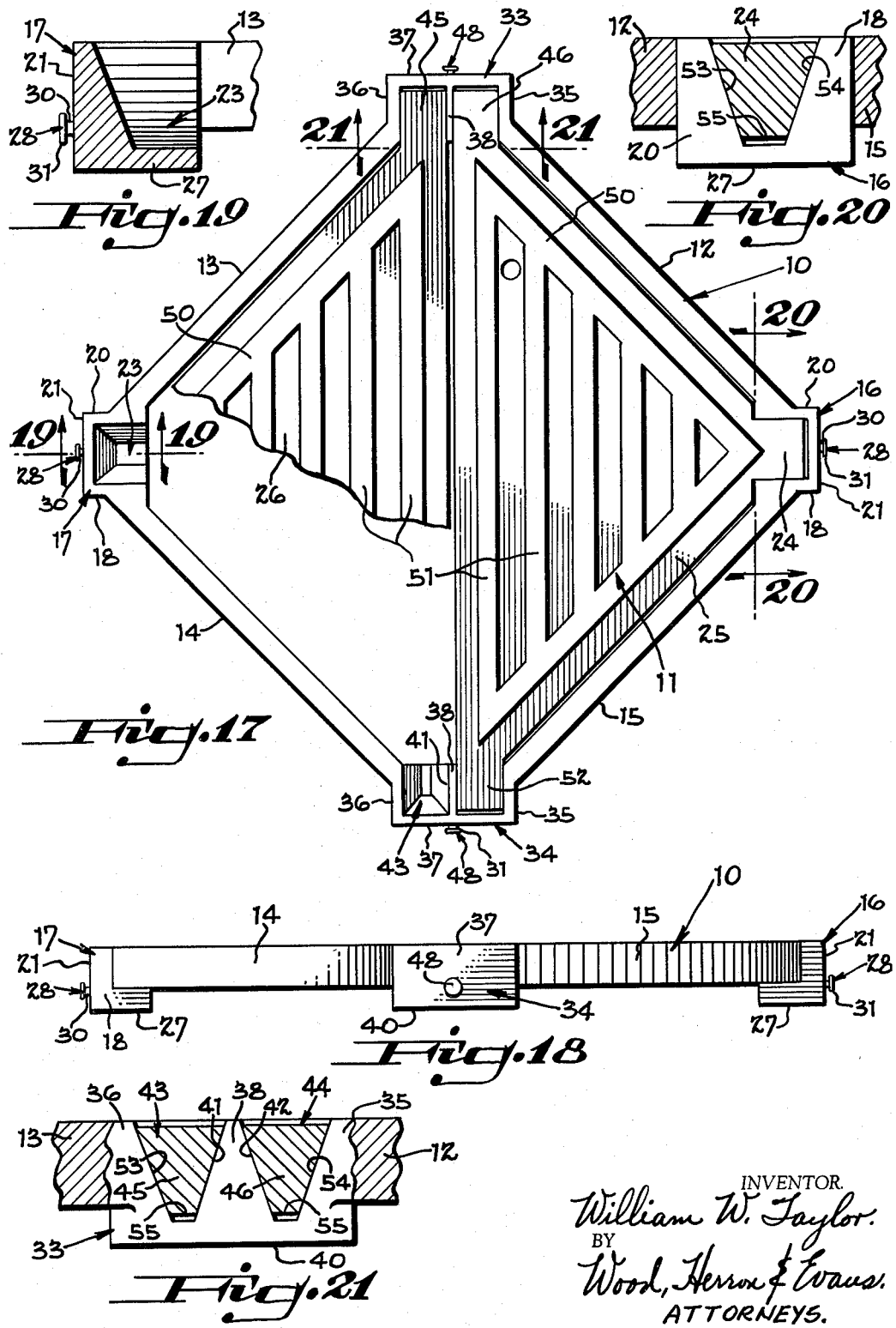

United States Patent Office 3,250,190
Patented May 10, 1966

3,250,190
METHOD AND APPARATUS FOR INSTALLING MANHOLE COVER FRAMES
William W. Taylor, 1614 N. Dixon Circle, Cincinnati, Ohio
Filed Sept. 6, 1962, Ser. No. 221,814
15 Claims. (Cl. 94—34)

The present invention relates to the installation of manholes of the type providing access to sewers, drains, conduits, and the like, and is more particularly directed to a method of installing a frame and cover for closing the openings of such manholes in streets, sidewalks and other paved areas.

One of the items of substantial cost involved in the paving of streets is the installation of manhole covers at the proper grade. One conventional method of installing such manholes involves the steps of digging the sewer trench, installing the sewer and constructing a cylindrical manhole to a level below the final grade. A manhole frame casting and cover are then loosely placed over the manhole while the subgrading operation is performed. Subsequently, the frame is raised to the correct height by laying bricks to raise the level of the manhole. The frame is then placed on the bricks and the concrete pavement is poured.

The cost of installing manholes by this and similar methods is composed of several factors. In the first place, the frames are heavy and must be individually trucked to the sites of the various manholes. Not only is the trucking operation expensive, but the frame and cover casting are subject to damage when they are unloaded. In the second place, the manual bricking up operation is relatively slow and expensive. Finally, in a large number of instances, the frame is pushed from the manhole during the subgrading operation so that quantities of dirt drop down into the sewer line. It has required as many as three days to clean out this dirt from a single manhole and the adjacent portions of a sewer line.

The present invention is directed to a novel method of installing manhole covers and frames which eliminates these difficulties and is substantially quicker, easier and less expensive than previous methods. The present invention further contemplates a novel manhole dome and frame construction and novel ancillary components for use in installing the frame.

More particularly, one form of frame which is particularly adapted for installation in accordance with the present method is in the form of a rectangular skeleton frame. This frame includes four arms joined together in the shape of a rectangle. Tapered sockets are formed at the four corners of the frame. These sockets are effective to support tapered lugs formed at the vertices of two lid sections which fit within the frame. The advantages of a rectangular frame having tapered seats in combination with triangular lids having mating tapered lugs are disclosed in William W. Taylor Patent No. 2,997,932. The present skeleton frame is additionally advantageous because it is lightweight which facilitates its handling and furthermore the frame does not include any outwardly extending flange to undercut concrete pavements and cause breakage to the latter through frost-heave.

In accordance with the present invention, one component employed in the construction of a manhole is a precast concrete manhole dome. The dome is mounted on the top of a conventonal cylindrical manhole with the top of the dome below the subgrade line. The dome supports and contains the frame and cover during the initial construction period and subsequently is utilized to support a liner member during final installation of the frame. More particularly, the present precast manhole dome includes a central opening surrounded by a recess of substantially the same outline as the frame and of a depth slightly greater than the frame so that the frame can be mounted within the recess. This recess preferably includes four ledges mounted along the inner edges of the recess extending above the bottom wall thereof. The spacing between the inner walls of opposing ledges is the same as the corresponding internal dimensions of the frame. The height of the ledges is such that when the frame is inserted in the recess the four arms of the frame rest upon the ledges.

In accordance with the present invention, this precast dome is shipped to the construction site with the frame and lids secured in place covering the opening in the manhole dome. Various other components to be used in the subsequent installation of the manhole frame are also tied or otherwise secured within the dome and preferably a cardboard cover and plastic sheet are placed over the frame and metal lid sections. Thus, the need to separately truck the manhole frame and lids is completely eliminated. After the sewer has been installed and the cylindrical manhole has been erected, the precast dome is mounted over the manhole with the top of the dome within a predetermined distance, for example 16 inches of the final grade. After the dome has been positioned, the subgrading is carried out in the usual manner. However, the top of the dome is completely sealed and no dirt can enter the manhole or sewer line.

Subsequently, the material covering the manhole is removed and the frame and cover are removed from the manhole dome. At this point, a box-like liner formed of any suitable material, such as waterproof corrugated board, is removed from the interior of the dome together with the other incidental items, such as clips and the like. These items have preferably been packaged in a plastic bag which has been tied to rungs formed on the interior of the dome. The cardboard liner is an upstanding member of the same outline configuration as the internal configuration of the frame. This member is supported between the ledges in the recess formed in the dome member and extends upwardly beyond the dome to a point above the final grade.

In the next step, top portions of the liner are marked and cut to the height of the final grade and four clips, or hangers, are suspended from these top walls. The clips include outwardly extending projections adapted to engage the bottom portions of the frame. The frame is then placed over the liner and is pressed downwardly until it engages the clips which are effective to support the top of the frame in the same horizontal plane as the trimmed edges of the liner which are in turn in registry with the final grade line. The frame is further held in position by means of wires stretched between projections on the frame and nails previously driven into the outer surface of the dome. Thereafter, the concrete is poured and finished in the conventional manner and the surface of the concrete will be flush with the upper surface of the frame. The only remaining step in the installation is to remove the cardboard liner and replace the lid sections in the frame.

One of the principal advantages of the present method of installing manhole frames and covers is that it is substantially quicker and more economical than the conventional method. It is estimated that as much as fifty dollars can be saved in the installation of a single manhole. In the first place, the need for separately trucking the manhole frames to the site is completely eliminated since the lightweight skeleton frames can be shipped preassembled with the precast dome. In the second place, the manual bricking up operation is completely eliminated. Also, since the manhole frame and cover are firmly mounted in the dome during the subgrading operation, no dirt can enter the manhole or sewer and the time consuming cleaning up operation is eliminated.

A still further advantage of the present method is that it facilitates the use of a lightweight skeleton frame which is not only more economical to produce and to handle, but also does not have any outwardly extending flange to undercut the concrete and cause breakage through frost-heave.

These and other objects and advantages of the present invention will be more readily apparent from the following detailed description of the drawings illustrating a preferred embodiment of the invention.

In the drawings:

FIGURE 5 is a plan view of the liner blank.

FIGURE 6 is a perspective view of a partially erected liner.

FIGURE 7 is a top plan view of a dome fitted with a partially erected liner.

FIGURE 8 is a cross sectional view taken along line 8—8 of FIGURE 7.

FIGURE 9 is a top plan view of a dome, liner and liner brace members.

FIGURE 10 is an elevation view of a dome and liner showing the manner in which a crown template is used to mark the final grade line of the liner.

FIGURE 11 is an elevational view of a dome and liner, the corners of the liner having been cut to receive mounting clips.

FIGURE 12 is an enlarged perspective view of a mounting clip.

FIGURE 13 is a top plan view of a dome, liner and liner blank showing the manner in which the frame is mounted over the liner and is carried by the clips.

FIGURE 14 is an elevational view of a manhole dome, liner and frame as shown in FIGURE 13.

FIGURE 17 is a top plan view of one preferred form of frame and lid for use with the present invention.

FIGURE 18 is an elevational view of the frame shown in FIGURE 17.

FIGURE 19 is a cross sectional view taken along line 19—19 of FIGURE 17.

FIGURE 20 is a cross sectional view taken along line 20—20 of FIGURE 17.

FIGURE 21 is a cross sectional view taken along line 21—21 of FIGURE 17.

Figures 1, 2:
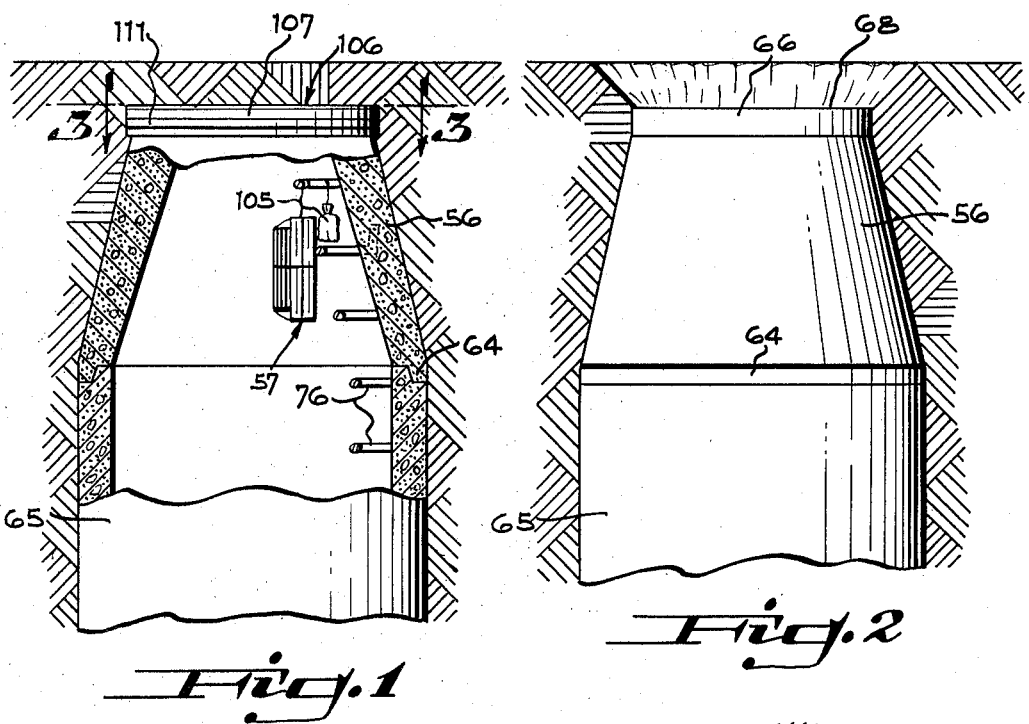
FIGURE 1 is an elevational view of a manhole dome of the present invention, partially broken away, showing the condition of the dome after subgrading and compacting operations.
FIGURE 2 is a view similar to FIGURE 1 showing the dirt excavated from the subgrade down to the top of the dome.
Figure 15:
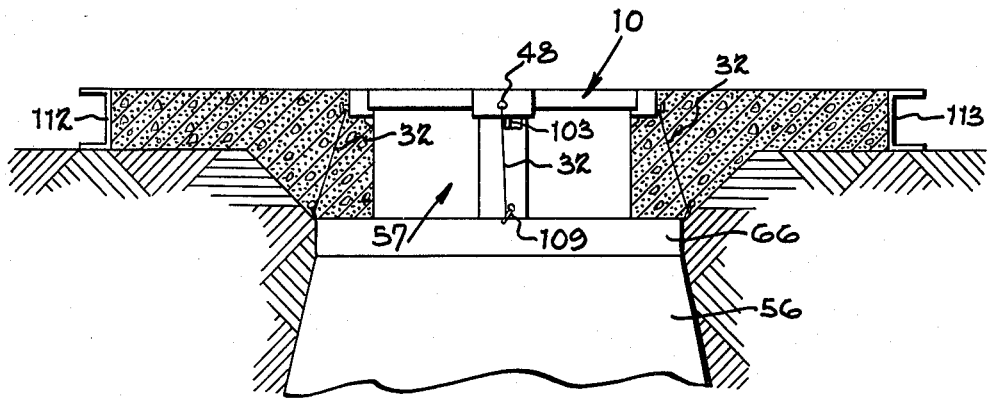
FIGURE 15 is a longitudinal view partially in section showing the manner in which the frame is ultimately supported in cast concrete.
Figure 16:
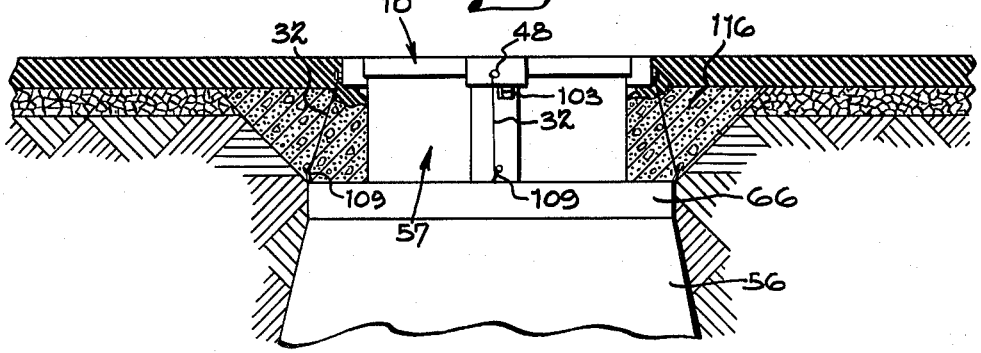
FIGURE 16 is a view similar to FIGURE 15 showing the manner in which the present frame and cover are supported in an asphalt pavement.

FIGURE 1 shows a precast manhole dome and frame of the present invention together with the remaining components employed in mounting the frame as they are positioned during and subsequent to the subgrading operation. FIGURE 15 shows a frame as it is completely installed. The manner in which the frame is installed in accordance with the present method is shown in FIGURES 2–4 and 7–15.

In order to simplify an understanding of the present invention, the various component members utilized in mounting the manhole cover and frame will be described initially. This description will be followed by a description of the manner in which these components are utilized in accordance with the present method.

More particularly, one preferred form of manhole frame 10 and cover 11 adapted to be installed utilizing the present method are shown in FIGURES 17–21. This frame and cover, when assembled, cooperate in the same manner to eliminate shifting and rattling as the cover and frame disclosed in Patent No. 2,997,932 for "Manhole Structure." It is to be understood, however, that the present method and apparatus can be utilized in installing different types of frames if desired.

More particularly, frame 10 is of generally rectangular plan. This frame comprises four side members 12–15. Each of these side members presents a flat upper surface and is preferably of rectangular cross section. At two diametrically opposite corners of the rectangle are formed two depending single socket or seat forming sections 16 and 17. Each of these single sockets 16 and 17 comprises side walls 18 and 20 and an end wall 21 which depend below the upper surface of frame side members 12–15. The side walls 18 and 20 and end wall 21 taper downwardly and inwardly along their inner surfaces to form a tapered seat 23 adapted to receive a lug 24 formed on the vertex of one of the triangular lid sections 25 or 26.

Seat 23 is preferably somewhat elongated with the axis of the seat lying along a diagonal of the rectangular frame. The bottom of the seat is enclosed by a wall section 27. The outer or end wall 21 of the seat preferably carries a corner button 28 having a stem 30 secured to the wall 21 in any suitable manner, such as by being cast, press fit, welded or the like. Each of the buttons 28 also is provided with an enlarged outer transverse flange 31 spaced from end wall 21 to provide room for winding a wire 32, or the like, around the button.

On the other two diametrically opposite corners of rectangular frame 10 are provided double socket sections 33 and 34. Each of the sections 33 and 34 comprises depending side walls 35 and 36 and a depending end wall 37 together with a center wall 38 and a bottom wall 40. Each of the side walls 35 and 36 and end wall 37 have a tapered inner surface while the center wall has two sloping surfaces 41 and 42. These inner surfaces define two tapered seats 43 and 44 spaced from one another by center wall 38. Seats 43 and 44 are adapted to receive tapered lugs 45 and 46 formed on lid sections 25 and 26.

Each of the seats 43 and 44 is elongated and has an axis extending parallel to a diagonal of frame 10. Each of the end walls 37 carries a button 48 identical with buttons 28 mounted upon walls 21.

Each of the cover sections 25 and 26 is of generally triangular configuration. The sections are dimensioned to fit within the adjacent elements of the frame member 10 so that the edges of the cover sections are spaced slightly from the adjacent walls of the frame. In the preferred embodiment shown in FIGURE 17, each of the lid sections is in the form of an isosceles right triangle. Consequently, the two lid sections are identical and are interchangeable.

Each of the lid sections comprises a surface plate 50 adapted to lie substantially flush with the upper surface of the surrounding frame when the cover is in position. This surface plate preferably has a plurality of reinforcing ribs (not shown) formed on the undersurface thereof. Moreover, the exposed upper surface of the plate is preferably provided with a plurality of projections 51 for providing greater traction between the surface plate and vehicle tires passing over it. The two lid sections 25 and 26 are preferably loosely joined together as by means of elongated tie rods (not shown) of the type shown in Patent No. 2,997,932.

Each of the lid sections 25 and 26 is provided with three outwardly extending lugs, such as lugs 24, 46 and 52, formed on section 25. Each of these lugs is preferably a prism of trapezoidal cross section including tapered side walls 53 and 54 of substantially the same taper as the tapered side walls of the seats. Each of the lugs also includes a bottom wall 55 which, as is best shown in FIGURES 20 and 21, is spaced above the bottom wall of the seats so that the sole engagement between the lugs and seats is along the tapered walls. As is explained in Patent No. 2,997,932, the frictional force between these walls is greater than the frictional force between a vehicle and lid so that the lugs provide a lock which is effective to prevent the lid from being shifted within the frame but do not interfere with removal of the lid by lifting it from the frame.

In addition to the frame member 10 and lid sections 25 and 26, the present frame installing equipment comprises the following novel components: a precast concrete conduit or manhole dome 56 (best shown in FIGURES 1 and 4), a cardboard liner 57 (FIGURE 6), struts 58, 60, 61 and 62 and clips 63.

More particularly, a precast manhole dome 56 is a frusto-conical dome member having a stepped bottom edge 64 adapted to engage the upper surface of the vertical manhole 65. The precast manhole dome 56 is preferably formed of concrete and includes a cylindrical upper section 66. This section has a central circular opening 67 which passes upwardly toward a horizontal upper surface 68 of the dome. A plurality of rungs or steps 76 are mounted within the interior of the dome.

A generally rectangular recessed portion 70 surrounds the upper portion of the central opening. The maximum depth of this recess is preferably slightly greater than the maximum height of the frame, i.e. the dimension from the bottom of the socket walls to the top surface of the frame arms. The configuration of the recess preferably follows the external configuration of the frame 10 and is slightly larger than the frame so that the frame can be received within the recess.

Figures 3, 4:
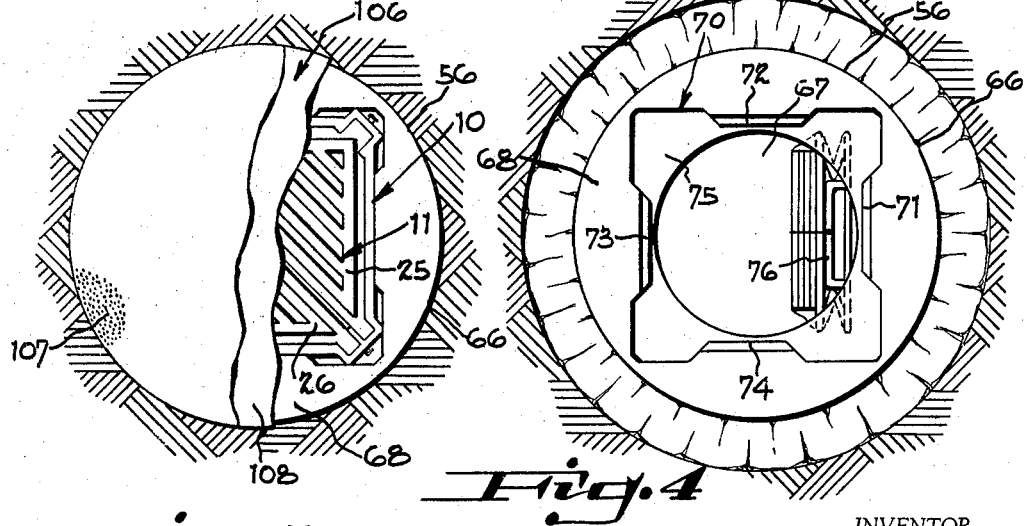
FIGURE 3 is a cross sectional view taken along line 3—3 of FIGURE 1 partially broken away to show details of construction.
FIGURE 4 is a top plan view generally similar to FIGURE 3 showing the top of the manhole dome with the frame and cover removed.

As best shown in FIGURES 4 and 8, four steps or ledges 71–74 are formed along each of the sides of the recess. The distance between opposite ledges is substantially the same as the distance between the inside edges of the opposite arms of the frame. The height of the ledges is preferably such that the frame arms rest upon the ledges with the bottom walls of the sockets in engagement with the bottom wall 75 of the recess. This protects the frame casting in the event that a substantial load should be applied to it. These ledges are adapted to perform a double function in that they initially support the frame across the top of the dome prior to the final frame positioning operation and then position and support the liner member 57 during the final pouring operation.

The next component to be described is the liner member 57. This liner member is preferably made of a heavy, waterproof, multi-ply corrugated board. Liner 57 is formed from a rectangular blank 77. It is to be understood that the corrugations run across the transverse dimensions of blank 77, or vertically in the finished liner shown in FIGURE 6. Blank 77 is provided with a plurality of spaced score lines. The score lines shown in FIGURE 6 in solid lines, such as score lines 78, 80, 81, 82, 83, 84 and 85, are made on one surface or on one ply of the corrugated board, while the score lines shown by dotted lines 86 and 87 are formed on the opposite side, or on the opposite ply.

In forming the liner the two endwise free edges, i.e. edges 88 and 90, are joined together in any suitable manner, such as by means of tape 91, wire stitches or the like. A web member 92 is stapled to the lower edge of each of two opposite side walls 93 and 94 of the liner. This web member is also preferably formed of the same corrugated material as the liner body, the corrugations in web 92 extending along the length of the web. Web 92 is provided with a transverse line of weakening 95 at its mid point so that the web can be bent upwardly.

The liner is adapted to be expanded to form a hollow box-like structure of generally rectangular cross section as is shown in FIGURE 9. As is there shown, walls 93 and 94 are opposite one another and extend in parallelism while walls 96 and 97 extend at right angles to walls 93 and 94. The external dimensions of the liner when so expanded are preferably substantially the same as the internal dimensions of the frame 10.

Liner 57 is also adapted to be folded into a flat package. When the liner is so folded, the end walls 96 and 97 are bent inwardly along score lines 86 and 87 and center web 92 is bent upwardly. This allows the two sections of walls 96 and 97 to be folded against one another and walls 93 and 94 to be brought into parallelism separated only by the double thickness of material at walls 96 and 97.

It will be noted that score lines 78–85 permit the liner to be unfolded with angulated corner wall sections 98 conforming to the inside surface of the frame sockets.

In order to hold the liner in the expanded position shown in FIGURE 9, two lower struts 58 and 60 are provided. Each of these struts is of rectangular shape and is formed of a heavy waterproof multi-ply corrugated material similar to that used in constructing the liner. The corrugations in each of the struts extend parallel to the longitudinal dimension of the struts. The length of the struts is preferably equal to the internal width of the frame less twice the thickness of the corrugated material comprising the liner. Consequently, when the two struts are inserted in the bottom of the liner, the struts being oriented at right angles to one another, these struts expand the liner into its rectangular condition in which the exterior walls of the liner fit snugly within surfaces 71–74.

Two additional upper struts 61 and 62 are inserted at right angles to one another across the upper portion of the liner 57 (FIGURE 13). These struts are identical with the lower struts 58 and 60. When the upper struts are inserted, the upper portion of the liner is expanded so that walls 93 and 94 and 96 and 97 of the liner form a rectangle of substantially the same dimensions as the interior dimensions of frame 10.

The other basic elements of the present apparatus are four clips 63. Each of these clips includes a downwardly extending panel 100 adapted to abut the external surface of one of the corner wall panels 98. The upper edge of wall 100 is joined by a transverse wall section 101 and a depending flange 102 which defines a downwardly opening channel adapted to embrace the upper edge of one of the corner panels 98. The lower edge of each of the clips 63 is provided with an outwardly extending tang 103. The depth of the clip from its wall 101 to the upper horizontal surface of tang 103 is preferably the same as the distance from the bottom wall of one of the sockets of frame 10 to the top surface of the frame. Thus, when a frame 10 is placed over the liner 57 with the bottom wall of the sockets resting upon tangs 103, the upper surface of the frame is flush with the upper wall 101 of the clips.

In installing a manhole frame and cover in accordance with the present method, a contractor first excavates a trench, installs a sewer and erects the cylindrical portion 65 of the manhole in the usual manner. A precast manhole dome 56 is then placed over the cylindrical portion 65 with the top of the precast dome within sixteen inches of the final pavement grade. The dome is preferably shipped to the contractor and erected with liner 56 folded flat and tied together with four struts 58–62 mounted within the dome as by tying a string to one of the ladder rungs 76. Also, a small bag 105 is tied to one of the rungs. This bag contains four clips 63 and preferably a razor blade to be used in the manner explained later. Also, frame 10 is mounted in the recess in the dome, the arms of the frame resting upon surfaces 71–74 and the bottom walls of the sockets resting on the bottom wall 75 of the recess. Lid sections 25 and 26 are inserted in the frame as is shown in FIGURE 3. Prior to shipment, concrete nails 109 are driven into exposed upper portions of the dome and wires 32 are laid flat over the lid.

Additionally, before the contractor receives the dome, a waterproof cardboard disc 106 is placed over the frame 10, lid sections 25 and 26 and the upper cylindrical portion of the manhole dome. Next, a plastic cover sheet 107 is placed over the cardboard lid 106. The plastic cover is releasably secured to the top cylindrical section 66 of the dome in any suitable manner, such as by means of a metal strap 111. The cardboard lid functions to protect this plastic cover from stone cuts and the like.

With the dome and other elements in place as described, the subgrading operations can be carried out in the usual manner. It is to be noted that the height of the subgrade is several inches above the height of the dome. Nevertheless, no dirt can enter the sewer line through the manhole since the top of the manhole is completely closed by the lid, plastic sheet and cardboard cover member.

Following the subgrading operation, the next step in installing a manhole frame is illustrated in FIGURE 2. In this step, workmen dig through the subgrade to clear the top of the dome. Then, as is shown in FIGURE 4, the plastic cover 107 and cardboard lid member 106 are removed together with metal frame 10 and lid sections 25 and 26. The liner and other components are also removed from the interior of the dome. The liner member 57 is inserted in a semi-collapsed position within recess 70. The lower edge of the liner rests upon bottom wall 75 of the recess while the side edges of the liner are received within the four ledges 71–74. The web 92 of the liner is then pressed downwardly and two struts 58 and 60 are inserted at right angles to one another to force the bottom walls of the liner firmly against the inner walls of the opposing ledges. Subsequently, two additional struts 61 and 62 are inserted at right angles to one another at the top of the liner. The liner is thus rigidly held in a rectangular configuration conforming to the inner configuration of the frame member 10.

In the next step, the contractor positions conventional side rails 112 and 113 for supporting a screed. A template 114, the lower edge of which conforms to the desired crown of the road, is placed across rails 112 and 113 as is shown in FIGURE 10 and pencil lines 115 are drawn on the side walls of the liner member 57 to indicate the exact final grade line.

In the next step shown in FIGURE 11, the angulated corner panels 98 are notched (using the razor blade provided) to the depth indicated by the pencil line and clips 63 are placed over these notched portions with the tangs 103 of the clips extending outwardly. The tops of the clips are thus positioned at the final grade line.

In the next step, as is shown in FIGURES 13 and 14, the frame 10 is placed over the liner 57. Since the liner conforms accurately to the interior dimensions of the frame, the frame fits snugly over the liner and rests upon the protruding tangs 103 which abut the bottom walls of the frame sockets. Wires 32 are tied between the nails and the four corner buttons 28 and 48. The frame 10 is thus rigidly held in place. The concrete pavement is then poured in the usual manner and the top surface of the concrete will be aligned with the top surface of the frame as is shown in FIGURE 15. To complete the installation, the contractor merely removes the cardboard liner and struts and reinserts the lid sections 25 and 26 in the frame.

The present method can also be used in installing manhole covers in asphalt surfaced roads. When installing the manhole frame in an asphalt road, exactly the same equipment is used and the steps are substantially the same. Specifically, the precast dome is mounted and sealed prior to the subgrading operation as explained above. Subsequent to the subgrading operation, the base and final asphalt surface are applied in the usual manner. Thus, the top of the dome is at this point covered by dirt and asphalt pavement.

In the next step, the asphalt pavement is dug away to expose the top cylindrical surface of the dome in the same general manner as is shown in FIGURE 2. The frame is then removed from the dome and the cardboard liner 57 erected as was explained previously. Again, the liner is marked with a line indicating the final grade and the corner panels 98 are cut preferably using the razor blade provided. Clips 103 are then placed over the corner members and the frame 10 mounted over the liner and supported on the clips. Thereafter, a quantity of concrete 116 is poured in the area surrounding the liner to within approximately an inch from the finished grade. This last inch is then patched with asphalt to match the remaining asphalt pavement.

From the above disclosure of the principles of the present invention and the above description of a preferred embodiment, those skilled in the art will readily comprehend various modifications to which the present invention is susceptible. For example, the precast dome can be replaced with a precast vault cover slab having an upper surface recessed in the same manner as the dome. Also, the present method can be utilized in connection with the installation of frames for supporting things other than manhole covers, for example storm water inlets and the like. Therefore, I desire to be limited only by the scope of the following claims.

Having described my invention, I claim:

1. Apparatus for supporting during a paving operation a manhole frame having a central opening, said apparatus comprising a foldable cardboard box-like liner member having an upper edge, said liner being adapted to be received within the opening in said frame, and clip means carried by the upper edge of said box-like member for engaging and supporting said frame.

2. A precast concrete manhole dome for use in conjunction with a box-like liner member for installing a rectangular frame having four arms, said dome comprising an upper surface, an opening of generally circular cross section extending through the upper surface of said dome, a recess of generally rectangular configuration surrounding said opening, four shelf-like projections disposed in said recess and extending toward said opening, said projections having vertically extending inner faces the bottom wall portions of said recess exteriorly of said center opening being adapted to engage and support the liner member while said vertically extending inner faces of said ledges engage said liner member.

3. A precast concrete manhole dome for use in conjunction with a box-like liner member for installing a rectangular frame, said dome comprising an upper surface, an opening of generally circular cross section extending through said upper surface, a recess of generally rectangular configuration surrounding said opening, four shelf-like projections disposed within said recess and extending toward said opening, said projections having vertical inner faces and having horizontal upper faces positioned to engage and support said frame, the bottom wall portions of said recess exteriorly of said center opening being adapted to engage and support the liner member while said vertical inner faces of said projections engage said liner member.

4. Apparatus for installing a manhole frame comprising a precast concrete dome having a central opening formed therein, a box-like liner member, said box-like liner member having an upper end and a lower end, said box-like liner member being mounted upon said dome surrounding said opening and extending vertically upwardly from said dome, said manhole frame being adapted to be mounted over the upper end of said liner member and clip means carried by the upper end of said liner member for supporting said frame at a predetermined elevation.

5. Apparatus for installing a manhole frame comprising a precast concrete dome having a central opening formed therein, a box-like liner member having an upper end, said box-like liner member being mounted upon said dome surrounding said opening and extending vertically upwardly from said dome, said manhole frame being adapted to be mounted over the upper end of said liner member and clip means carried by said liner member for supporting said frame at a predetermined elevation, said clip means comprising a plurality of clips including channel portions overhanging portions of the upper edge of said liner member, and having an outwardly extending projection engaging and supporting a surface of said frame.

6. Apparatus for installing a manhole frame comprising a box-like liner member formed of waterproof corrugated board having four vertical side walls joined together, a web extending between two opposite walls adjacent the bottom portion thereof, the corrugations in said side walls extending vertically, and clip means carried by the upper edge of said liner member for supporting said frame at a predetermined elevation.

7. Apparatus for installing a manhole frame comprising a box-like liner member formed of waterproof corrugated board having four vertical side walls joined together, a web extending between two opposite walls adjacent the bottom portion thereof, the corrugations in said side walls extending vertically, clip means carried by the upper edge of said liner member for supporting said frame at a predetermined elevation, and a plurality of struts, each of said struts comprising sheets of corrugated board, each of said struts being inserted within said box-like liner in engagement with opposite walls thereof, the corrugations of said struts extending perpendicular to said walls.

8. Apparatus for installing a manhole frame comprising a box-like liner member formed of waterproof corrugated board having four vertical side walls joined together, a web extending between two opposite walls adjacent the bottom portion thereof, the corrugations in said side walls extending vertically, clip means carried by the upper edge of said liner member for supporting said frame at a predetermined elevation, and vertical lines of weakening in two opposite walls of said liner member and a line of weakening in said web whereby said liner member may be folded substantially flat prior to use.

9. Apparatus for installing a manhole frame or the like in the final grade surface of a paved area, said apparatus comprising a vertical concrete conduit having an upper end disposed below final grade, said conduit having an opening in said upper end, a box-like liner member surrounding said opening, said box-like liner member being supported upon said upper end and extending upwardly from said upper end, said manhole frame having a central opening, clip means for supporting said skeleton frame on the upper end of said liner member, said liner member conforming to the central opening in said frame, the length of said liner member being such that said frame is adapted to be supported at final grade.

10. The method of installing manhole frames and covers which comprises the steps of erecting a manhole and manhole dome having a recessed opening so that the top of said dome lies in a plane below subgrade, mounting said frame and cover in the recess in said dome whereby the opening of said dome is closed, performing the subgrading operation, removing material above the manhole to expose the top thereof, removing said cover and frame, mounting a liner within the recess of said dome whereby said liner rests upon said dome and extends upwardly, marking final grade upon said liner, trimming at least portions of the upper edge of the liner to conform to final grade, mounting a plurality of clips upon the trimmed upper edge portions of said liner, placing said frame over said liner in engagement with said clips whereby the top of said frame is supported at final grade, pouring concrete, whereby said frame is embedded in concrete at final grade.

11. The method of installing manhole frames and covers in an asphalt road, or the like, which comprises the steps of erecting a manhole and manhole dome having a recessed opening so that the top of said dome lies in a plane below subgrade, mounting said frame and cover in the recess in said dome whereby the opening of said dome is closed, performing the subgrading operation, laying said asphalt pavement, removing material above the manhole to expose the top thereof, removing said cover and frame, mounting a liner within the recess of said dome whereby said liner rests upon said dome and extends upwardly, marking final grade upon said liner, trimming at least portions of the upper edge of said liner to conform to final grade, mounting a plurality of clips upon the trimmed upper edge portions of said liner, placing said frame over said liner in engagement with said clips, whereby the top of said frame is supported at final grade, pouring concrete, whereby said frame is embedded in concrete at final grade.

12. The method of installing manhole frames and covers in an asphalt road, or the like, which comprises the steps of erecting a manhole and manhole dome having a recessed opening so that the top of said dome lies in a plane below subgrade, mounting said frame and cover in the recess in said dome whereby the opening of said dome is closed, performing the subgrading operation, laying said asphalt pavement, removing material above the manhole to expose the top thereof, removing said cover and frame, mounting a liner within the recess of said dome whereby said liner rests upon said dome and extends upwardly, marking final grade upon said liner, trimming at least portions of the upper edge of said liner to conform to final grade, mounting a plurality of clips upon the trimmed upper edge portions of said liner, placing said frame over said liner in engagement with said clips, whereby the top of said frame is supported at final grade, pouring concrete, whereby said frame is embedded in concrete at final grade, said concrete being poured to a level below final grade and subsequently patching asphalt over said concrete.

13. In the method of installing manhole frames and covers which comprises the steps of erecting a manhole and manhole dome having a recessed opening so that the top of said dome lies in a plane below subgrade, mounting a box-like liner within the recess of said dome whereby said liner extends upwardly, marking final grade upon said liner, trimming at least portions of the upper edge of said liner to conform to final grade, mounting a plurality of clips upon the trimmed portion of said liner, placing said frame over said liner in engagement with said clips whereby the top of said frame is supported at final grade, pouring concrete, whereby said frame is embedded in concrete at final grade.

14. In a method of installing a frame such as a manhole frame or the like in the surface of a paved area, the steps of erecting a vertical concrete conduit member having an upper surface below grade, supporting a box-like liner upon said surface, said box-like liner extending upwardly a predetermined distance, mounting a frame over said liner, said liner conforming to an interior opening of said frame and supporting said frame at final grade, pouring concrete about said liner whereby said frame is embedded in concrete at final grade.

15. In a method of installing a frame such as a manhole frame or the like in the surface of a paved area, the steps of erecting a vertical concrete conduit member having a top surface below grade, supporting a box-like liner upon said surface, said box-like liner extending upwardly, trimming said box-like liner whereby an upper surface of said liner is aligned with final grade, supporting a frame from the trimmed portion of said liner, said liner conforming to an interior opening of said frame and supporting said frame at final grade, pouring concrete about said liner whereby said frame is embedded in concrete at final grade.

(References on following page)

References Cited by the Examiner

UNITED STATES PATENTS

| | | | |
|---|---|---|---|
| 1,639,495 | 8/1927 | Frame | 94—34 |
| 1,710,571 | 4/1929 | Forni | 94—34 |
| 1,793,038 | 2/1931 | Zimmermann | 94—34 |
| 1,852,928 | 4/1932 | Helling | 94—34 |
| 2,254,668 | 9/1941 | Tomek | 94—34 |
| 3,025,774 | 3/1962 | Bush | 94—34 |

FOREIGN PATENTS

| | | |
|---|---|---|
| 1,103,425 | 5/1955 | France. |
| 1,092,637 | 11/1960 | Germany. |
| 789,542 | 1/1958 | Great Britain. |

CHARLES E. O'CONNELL, *Primary Examiner*.

JACOB L. NACKENOFF, *Examiner*.

N. C. BYERS, *Assistant Examiner*.